(12) United States Patent
Elsworth et al.

(10) Patent No.: US 7,419,719 B2
(45) Date of Patent: Sep. 2, 2008

(54) HIGH STRENGTH, LONG DURABILITY STRUCTURAL FABRIC/SEAM SYSTEM

(75) Inventors: Sharon A. Elsworth, Mason, NH (US); Marvin I. Fredberg, Stoughton, MA (US); William H. Fossey, Jr., Arlington, MA (US); Stuart Press, Guilford, CT (US); Thad H. Fredrickson, Frederica, DE (US)

(73) Assignee: Raytheon Company, Waltham, MA (US)

( * ) Notice: Subject to any disclaimer, the term of this patent is extended or adjusted under 35 U.S.C. 154(b) by 103 days.

(21) Appl. No.: 10/773,125

(22) Filed: Feb. 5, 2004

(65) Prior Publication Data

US 2005/0130523 A1 Jun. 16, 2005

Related U.S. Application Data

(60) Provisional application No. 60/445,940, filed on Feb. 7, 2003.

(51) Int. Cl.
*B32B 27/00* (2006.01)
*B32B 27/02* (2006.01)
*B32B 27/04* (2006.01)
*B32B 27/40* (2006.01)

(52) U.S. Cl. .............. 428/357; 428/364; 428/365; 428/411.1; 428/423.1

(58) Field of Classification Search .......... 442/59; 427/180, 212; 428/357, 364, 365, 411.1, 428/423.1
See application file for complete search history.

(56) References Cited

U.S. PATENT DOCUMENTS

| | | | | |
|---|---|---|---|---|
| 3,669,920 A | * | 6/1972 | Haggis et al. | 524/871 |
| 3,673,611 A | * | 7/1972 | Cain et al. | 2/175.1 |
| 4,144,027 A | * | 3/1979 | Habib | 8/127.6 |
| 4,227,350 A | * | 10/1980 | Fitzer | 51/295 |
| 4,279,676 A | | 7/1981 | Morrison et al. | |
| 4,506,269 A | | 3/1985 | Greene | |
| 4,826,508 A | * | 5/1989 | Schwartz et al. | 51/293 |
| 5,357,726 A | | 10/1994 | Effenberger et al. | |
| 5,360,503 A | | 11/1994 | Coffy | |

(Continued)

FOREIGN PATENT DOCUMENTS

EP 0 636 472 A1 2/1995

(Continued)

OTHER PUBLICATIONS

Database WIP, Section Ch, Week 199747, Derwent Publications Ltd., London, GB, AN 1997-510961 XP002289725 & RU 2 078 865 C1 Golland V A, May 10, 1997.

(Continued)

*Primary Examiner*—Arti Singh
*Assistant Examiner*—Matthew D Matzek
(74) *Attorney, Agent, or Firm*—Daly, Crowley, Mofford & Durkee, LLP

(57) ABSTRACT

A high strength, high modulus structural fabric product and the method of manufacturing the product are disclosed. The incorporation of a specific fiber/fabric treatment coupled with a resin impregnation and coating process produces a composite material. This composite material comprises high strength and modulus fibers embedded in and linked to a matrix. The resulting fabric product is useable in the formation of seamed structures, which carry and distribute high-level loads under extreme environmental conditions.

11 Claims, 2 Drawing Sheets

U.S. PATENT DOCUMENTS

| | | | |
|---|---|---|---|
| 5,976,998 A * | 11/1999 | Sandor et al. | 442/365 |
| 6,911,955 B2 * | 6/2005 | Fossey et al. | 343/872 |
| 2004/0101680 A1 * | 5/2004 | Barber, Jr. | 428/360 |
| 2004/0151865 A1 | 8/2004 | Howland | |
| 2005/0013961 A1 | 1/2005 | Fossey et al. | |
| 2005/0014430 A1 | 1/2005 | Fredberg et al. | |
| 2005/0024289 A1 | 2/2005 | Fredberg et al. | |

FOREIGN PATENT DOCUMENTS

| | | |
|---|---|---|
| EP | 1 097 804 A1 | 5/2001 |
| EP | 1 273 935 A1 | 1/2003 |
| FR | 2 544 322 | 10/1984 |
| GB | 833 075 A | 4/1950 |

OTHER PUBLICATIONS

PCT/US2004/003231 International Search Report.
Database WPI, Abstract, May 10, 1997, Derwent Publication : Ltd., London, Great Britain.
Database WPI, Abstract, May 15, 1981, Derwent Publication : Ltd. London, Great Britain.

* cited by examiner

HIGH STRENGTH, LONG DURABILITY STRUCTURAL FABRIC/SEAM SYSTEM

CROSS REFERENCE TO RELATED APPLICATIONS

This application claims the benefit of provisional application Ser. No. 60/445,940 filed Feb. 7, 2003, the disclosure of which is hereby incorporated by reference.

STATEMENT REGARDING FEDERALLY SPONSORED RESEARCH

This work was sponsored under Department of Defense Contract No. HQ006-01-C-001. The government has certain rights in this invention.

FIELD OF THE INVENTION

The present invention relates generally to treated woven, knitted or unidirectional fabric, and more particularly to a treated woven, knitted or unidirectional fabric which is used to provide structures that can withstand high level working loads and extreme environmental conditions.

BACKGROUND OF THE INVENTION

Woven or knitted fabrics coated with a resin such as Poly-Vinyl Chloride (PVC), polytetrafluorethylene (PTFE), urethane or other suitable resin have been used to provide structures. The fibers or fiber bundles of the woven fabric are coated with a resin, thereby forming a matrix surrounding the fibers. The matrix material is typically the medium, by which seams in the construction, can transfer load across the joints in the fabric. One example of such a structure is a radome, which is a dome shaped protective housing used to cover a radar antenna. A radome may be subject to a severe set of conditions such as supporting heavy loads for extended periods of time at extreme temperatures and humidity.

Traditional fabric structures apply resin-based coatings to the fabric substrate via 'knife-over-roll' or film lamination techniques. In order to take structural advantage of a fiber structure, applied loads should be able to transfer from one fiber bundle to another and the full load capability of the fabric should be able to be transferred across joints in the fabric. The resin system applied to the fabric assists with load transfer. However, the effectivity of this load transferring ability is directly related to the interface between the fiber and the resin. This interface is dependent both on the volume of surface contacted, the linkage between the fiber surface and the resin, and the resin properties. When a fabric is coated with resin, the coating is only in contact with the exposed outer surface of the fiber bundles and, effectively, the fiber/resin product (also referred to as the fabric product) is full of voids or air pockets within the fiber bundles. When an applied load encounters a void, the load cannot be transferred or carried from fiber filament to filament. The propagation of the load effectively stops and a stress concentration develops that eventually exceeds the fabric load resistance, resulting in a failure of the fabric product. This effect is most pronounced at the fabric seam locations where the fiber bundles are not continuous across the joint.

A drawback associated with these coated woven fabrics and seams is that when they are utilized to provide a structure such as a radome, they typically do not withstand the long duration, high level working loads and extreme environmental conditions.

One attempt to resolve the above-mentioned drawback was to increase the base fabric load carrying capability, load transfer capability and fiber bundle load sharing capability by modifying existing fabric weave designs. These attempts did not produce a fabric/seam system product, which could withstand the working loads and environmental conditions mentioned above. Another attempt to overcome the above mentioned drawback involved development of new fabric/fiber technology. Although this attempt utilized innovative fiber and fabric designs, this attempt relied on traditional fabric coating technology that failed to achieve the required combination of properties between the fiber system and the resin matrix, resulting in premature seam failure. The net result of both attempts was unacceptable operation in the area of seam performance of the structure.

SUMMARY OF THE INVENTION

A high strength, high modulus structural fabric product and the method of manufacturing the product are presented. The incorporation of a fiber/fabric treatment coupled with a resin impregnation and coating process produces a composite material. This composite material comprises high strength and modulus fibers embedded in and coupled to a matrix such that the resin matrix material penetrates to the filament level of the fiber bundle. The resulting fabric product is useable in the formation of structures, which carry and distribute high-level loads across seams under extreme environmental conditions.

BRIEF DESCRIPTION OF THE DRAWINGS

The invention will be more fully understood from the following detailed description taken in conjunction with the accompanying drawings, in which.

DETAILED DESCRIPTION OF THE INVENTION

The present invention comprises a high strength, high modulus structural fabric product and the method of manufacturing the product. Utilizing a fiber/fabric treatment and a resin impregnation and coating process a fabric product useable in air-supported structures, which is able to carry and distribute high level loads across seams under extreme environmental conditions and with high levels of survivability, is provided. The incorporation of a fiber/fabric treatment coupled with a resin impregnation and coating process produces a composite material. This composite material comprises high strength and modulus fibers embedded in and coupled to a matrix such that the resin matrix material penetrates to the filament level of the fiber bundle. In this form, both the fibers and the matrix retain their physical and chemical identities, and further produce a combination of properties that are not achieved with either constituent acting alone.

In general, the fibers of the fabric are the principal load carrying members. The fabric is combined with a surrounding resin matrix which keeps the fibers in a desired location and orientation. The surrounding matrix further acts as a load transfer medium between the fibers, provides a shear load transfer medium across seams and protects the fibers from damage due to environmental conditions such as temperature, humidity, and sunlight.

The present invention utilizes a resin application technology that effectively 'impregnates' a fabric substrate such that the resin surrounds fibers and fiber bundles and infiltrates the fiber bundles to the filament level. The result is a fabric structure that has the combined properties of the resin for load transfer capabilities and the fiber/fabric system to carry loads.

Figure 1:
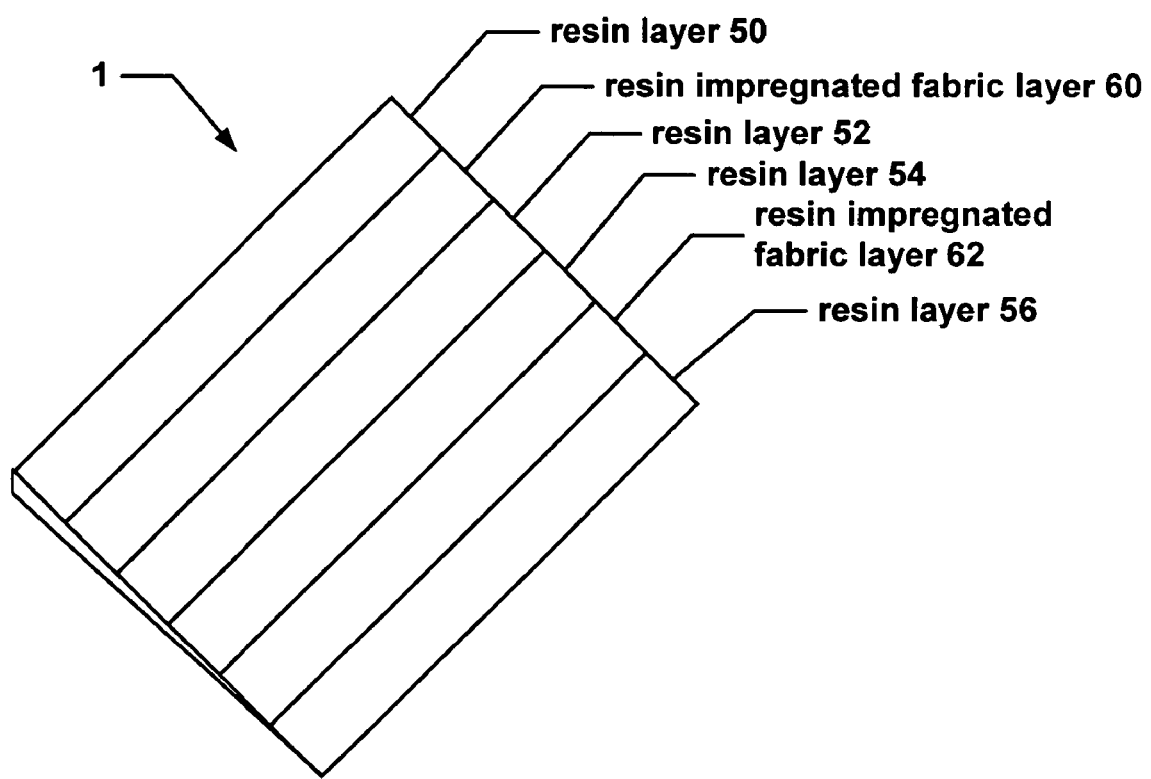
FIG. 1 is a diagram of the fabric product.

Referring to FIG. 1, a sectional isometric view of a particular embodiment of a fabric product 1 incorporating the present invention is shown. The fabric product 1 includes resin impregnated fabric layer 60. The resin impregnated fabric layer includes a fabric made of fibers such as Vectran®, Kevlar® or other high performance fiber which has been impregnated with the resin. As discussed above, the resin surrounds and infiltrates the fiber bundles of the fabric to the filament level.

The resin impregnated layer 60 has a resin coating layer 50 disposed across a top surface and a resin coating layer 52 disposed across the bottom surface. The resin coating layers thus cover the top and bottom surfaces of the resin impregnated fabric layer. Also shown is a second resin impregnated layer 62, which also has a resin coating layer 54 disposed across a top surface and a resin coating layer 56 disposed across the bottom surface of the resin impregnated fabric layer 62. While fabric product 1 comprising two-layers of the resin layer-resin impregnated fabric layer-resin layer groups is shown it should be appreciated that a fabric product could be comprises of any number of resin impregnated fabric layers and resin layers.

The resulting fabric product 1 may contain one or more resin impregnated fabric layers, 60 and 62 which are formed using a two-part castable urethane or other suitable resin system capable of providing resin penetration to individual filaments of the fabric. As an example, traditional two part castable urethane systems use a resin to curative stoichiometry range of 85 to 110% theory. The curative stoichiometry refers to the ratio of chemical components and the ratio of reaction to each of the components. Typical stoichiometry are in the 95% range. A fabric product produced using a resin system 85-110% stoichiometry range did not achieve the desired performance.

Traditionally, stoichiometry range levels below 85% have not been used, with the belief that an unusable polymer would result. However, by using a 75% stoichiometry range level, the resulting composite (also referred to as an impregnation compound) yielded both high shear strength under high seam loads and uniform strength throughout the composite. This result is in direct contrast to prior experience and recommendations of resin manufacturers.

In a particular embodiment the impregnation compound includes three components: a urethane pre-polymer, a co-reactant curative, and a diluent, such as toluene. The impregnation compound in this embodiment is formulated as follows:

| | |
|---|---|
| Polyurethane Specialties Pre-Polymer PCA 6-3 | 100.0 Parts by weight |
| Uniroyal Chemical Caytur 31 curative | 26.1 Parts by weight |

The mixture is then diluted to 75% total solids with toluene. The ratio of curative to pre-polymer is derived from the formula:

$$\frac{6.34 \times 0.75 \times 230}{42} = \frac{\text{parts by weight of curative per}}{100 \text{ parts of pre-polymer}}$$

where 6.34 is the isocyanate content of the pre-polymer, 0.75 is the desired stoichiometry, 230 is the equivalent weight of the curative, and 42 is the equivalent weight of the isocyanate.

As described above, traditional fabric structures apply resin based coatings to the fabric. When a fabric is coated with resin, the coating is only in contact with the outer filaments of the fiber bundles and, effectively, the fiber/resin system is full of voids or air pockets within the fiber bundles. When an applied load encounters a void, the load cannot be transferred or carried. The propagation of the load effectively stops and a stress concentration develops that eventually becomes greater than the fiber/fabric strength. These coating techniques do not drive the resin into the interstitial sites of the fabric nor into the individual fiber bundles or fiber filaments of the fabric.

Figure 2:
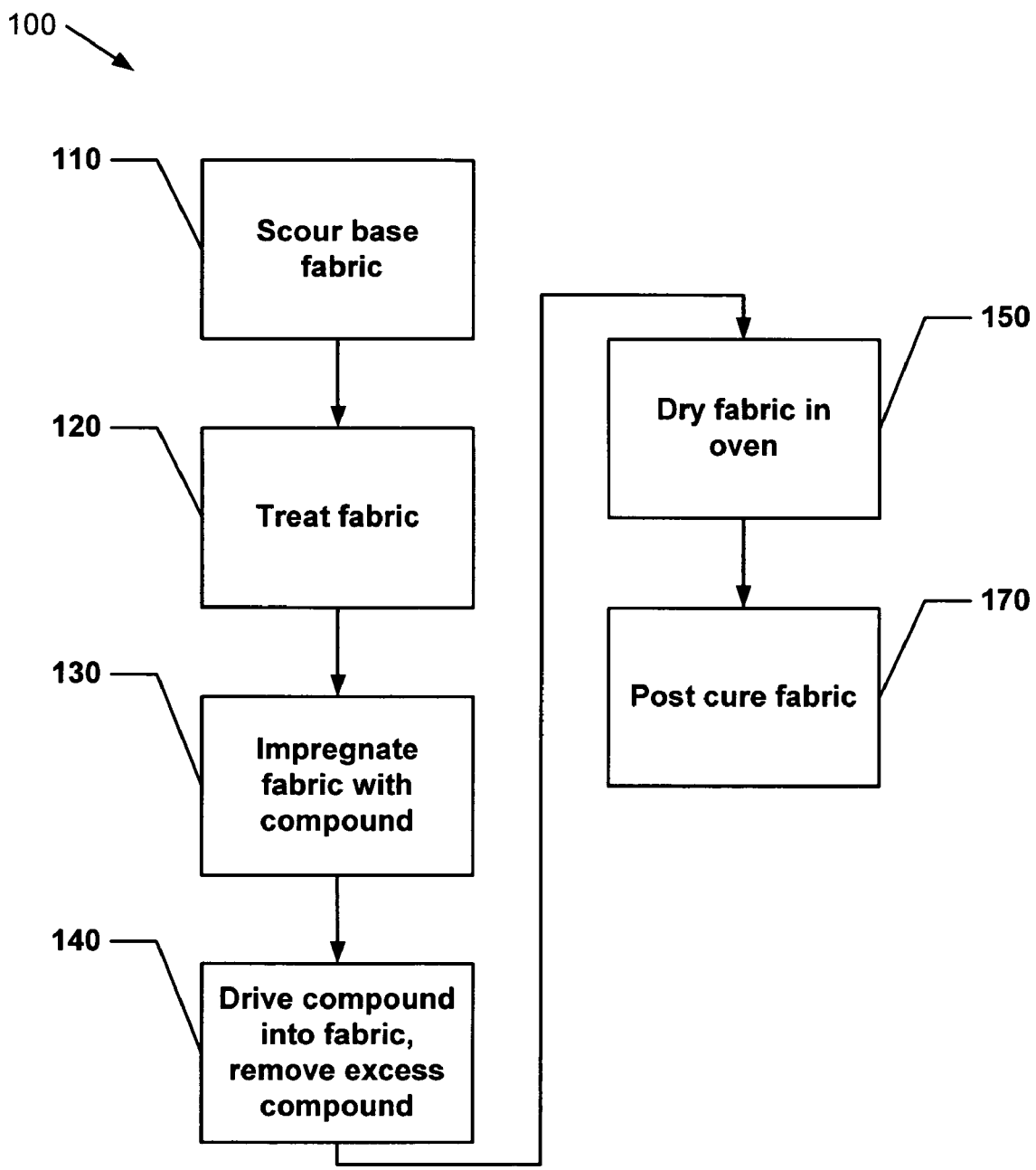
FIG. 2 is a flow chart of the process utilized to produce the fabric product.

A flow chart of the presently disclosed method for applying the impregnating compound into the fabric is depicted in FIG. 2. The rectangular elements are herein denoted "processing blocks" and represent instructions or groups of instructions.

The method of producing the fabric product is described in conjunction with the flow chart of FIG. 2. The method 100 begins at processing block 110 wherein the base fabric is scoured to remove any lubricants applied by the yarn manufacturer, or those lubricants applied by the weaver. These lubricants could interfere with the development of high integrity resin to the base fabric interface. After scouring, processing proceeds with processing block 120.

Processing block 120 recites treating the fabric with a polymeric isocyanate to enhance adhesion of the impregnation compound to the fabric. Processing block 130 is performed next wherein the impregnation of the base fabric is performed. The impregnation of the fabric involves the continuous submersion of the fabric in a tank containing the impregnation compound.

At processing block 140, after the fabric emerges from the tank, the fabric is squeezed by a set of nip rolls to further drive the impregnation compound into the fabric fibers and to remove any excess impregnation compound.

The fabric is then fed into a drying oven, as shown in processing block 150. Preferably the drying oven is set at a temperature as required to remove diluents from the fabric-resin composite.

Processing block 170 is executed next wherein the resulting impregnated fabric is post cured at a temperature as required to cure the resin system. Following processing block 170 the fabric is ready for subsequent processing.

The resulting impregnated fabric is incorporated into the fabric product and is used to produce fabric structures. In the case of a radome incorporating the present invention, the radome fabric can withstand working loads as high as 880 pounds per inch width for 56 hours at a temperature of 35 degrees C. in a humid environment. This invention allows the use of thermally welded seams to meet these demanding requirements. Seams made from this material are able to withstand in excess of 56 hours at 880 pounds per inch load, with high humidity, at 35° C. using an overlap seam construction. This seam performance has not been achieved in other flexible composite applications.

A high strength, high modulus structural fabric product and the method of manufacturing the product have been described. The incorporation of a specific fiber/fabric treatment coupled with resin impregnation and coating processes produces a composite material. This composite material comprises high strength and modulus fibers embedded in and coupled to a matrix. The resulting fabric product is useable in the formation of seamed structures which carry and distribute high-level loads under extreme environmental conditions.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A fabric product comprising:
    a fabric layer having a plurality of high strength and high modulus fibers, the plurality of fibers impregnated by an impregnation compound with the fabric layer coated on each side with the impregnation compound, where the impregnation compound is derived from a mixture comprising:
        a pre-polymer comprises an isocynate having an equivalent weight of 42, the pre-polymer having an isocynate content of 6.34;
        a co-reactant curative having an equivalent weight of 230; and
        a diluent, said diluent solvating the mixture of said pre-polymer and said curative,
    and wherein said impregnation compound has a curative stoichiometry range of less than 85 percent,
    wherein the high strength and high modulus fibers comprise at least one of aramid fibers or aromatic polyester fibers,
    wherein the ratio of said curative to said pre-polymer is derived from the formula $$\frac{6.34 \times 0.75 \times 230}{42} = \frac{\text{parts by weight of curative per}}{100 \text{ parts of pre-polymer}}$$

wherein the pre-polymer comprises an isocynate and where 6.34 is the isocynate content of the pre-polymer, 0.75 is the desired stoichiometry of the mixture, 230 is the equivalent weight of the curative and 42 is the equivalent weight of the isocynate.

2. The fabric product of claim 1 wherein said impregnation compound has a curative stoichiometry range of approximately 75 percent.

3. The fabric product of claim 1 wherein the pre-polymer comprises a urethane pre-polymer.

4. The fabric product of claim 1 wherein said diluent comprises a solvent.

5. The fabric product of claim 1 wherein the aramid fibers comprise polyaramid polyparaphenylene terephthalamide fibers.

6. The fabric product of claim 1 wherein the aromatic polyester fibers comprise polyester-polyarylate fibers.

7. A fabric product comprising at least one resin fabric piece, said resin fabric piece comprising:
    a resin impregnated fabric layer comprising high strength and high modulus fibers and having a resin impregnated therein;
    a first resin layer having a resin disposed on a first side of said resin impregnated fabric layer; and
    a second resin layer having a resin disposed on a second side of said resin impregnated fabric layer, wherein the resin is derived from a mixture comprising:
        a pre-polymer comprises an isocynate having an equivalent weight of 42, the pre-polymer having an isocynate content of 6.34;
        a co-reactant curative having an equivalent weight of 230; and
        a diluent, said diluent solvating the mixture of said pre-polymer and said curative,
    and wherein said impregnation compound has a curative stoichiometry range of less than 85 percent,
    wherein the high strength and high modulus fibers comprise at least one of aramid fibers or aromatic polyester fibers;
    wherein said resin has a ratio of said curative to said pre-polymer in accordance with the formula $$\frac{6.34 \times 0.75 \times 230}{42} = \frac{\text{parts by weight of curative per}}{100 \text{ parts of pre-polymer}}$$

where the pre-polymer comprises an isocynate and where 6.34 is the isocynate content of the pre-polymer, 0.75 is the desired stoichiometry of the mixture, 230 is the equivalent weight of the curative and 42 is the equivalent weight of the isocynate.

8. The fabric product of claim 7 wherein said resin has a curative stoichiometry range of approximately 75 percent.

9. The fabric product of claim 7 further comprising a second resin fabric piece disposed along a surface of said second resin layer.

10. The fabric product of claim 7 wherein the aramid fibers comprise polyaramid polyparaphenylene terephthalamide fibers.

11. The fabric product of claim 7 wherein the aromatic polyester fibers comprise polyester-polyarylate fibers.

* * * * *

UNITED STATES PATENT AND TRADEMARK OFFICE
CERTIFICATE OF CORRECTION

PATENT NO. : 7,419,719 B2 Page 1 of 1
APPLICATION NO. : 10/773125
DATED : September 2, 2008
INVENTOR(S) : Elsworth et al.

It is certified that error appears in the above-identified patent and that said Letters Patent is hereby corrected as shown below:

Col. 2, line 7-8, delete "above mentioned" and replace with -- above-mentioned --.

Col. 2, line 14, delete "was unacceptable" and replace with -- was an unacceptable --.

Col. 2, line 45, delete "process a fabric" and replace with -- process, a fabric --.

Col. 3, line 24, delete "shown it" and replace with -- shown, it --.

Col. 3, line 25, delete "comprises" and replace with -- comprised --.

Col. 3, line 37, delete "system" and replace with -- system of --.

Col. 5, line 1-2, delete "invention it" and replace with -- invention, it --.

Col. 5, line 4, delete "that that the" and replace with -- that the --.

Signed and Sealed this

Eighteenth Day of November, 2008

JON W. DUDAS
*Director of the United States Patent and Trademark Office*